US012427766B2

(12) United States Patent
Itagi et al.

(10) Patent No.: US 12,427,766 B2
(45) Date of Patent: Sep. 30, 2025

(54) DRIVE BOARD, LIQUID JET HEAD, AND LIQUID JET RECORDING DEVICE

(71) Applicant: SII Printek Inc., Chiba (JP)

(72) Inventors: Akihiro Itagi, Chiba (JP); Yukihiro Saga, Chiba (JP)

(73) Assignee: SII PRINTEK INC., Chiba (JP)

( * ) Notice: Subject to any disclaimer, the term of this patent is extended or adjusted under 35 U.S.C. 154(b) by 157 days.

(21) Appl. No.: 18/173,326

(22) Filed: Feb. 23, 2023

(65) Prior Publication Data

US 2023/0278333 A1 Sep. 7, 2023

(30) Foreign Application Priority Data

Mar. 7, 2022 (JP) ................................ 2022-034771

(51) Int. Cl.
*B41J 2/045* (2006.01)

(52) U.S. Cl.
CPC ....... *B41J 2/04541* (2013.01); *B41J 2/04581* (2013.01)

(58) Field of Classification Search
CPC ............... B41J 2/04541; B41J 2/04581; B41J 2/14209; B41J 2002/14491; B41J 2/045
See application file for complete search history.

(56) References Cited

U.S. PATENT DOCUMENTS

2014/0092155 A1 4/2014 Suzuki
2017/0239940 A1 8/2017 Yamashita
2019/0255847 A1* 8/2019 Nitta .................... B41J 2/14072
2019/0351679 A1* 11/2019 Ito ........................ B41J 2/04596

FOREIGN PATENT DOCUMENTS

JP 2002-254629 A 9/2002
JP 2008087338 A * 4/2008

OTHER PUBLICATIONS

B5 Extended European Search Report in EP Application No. 23158931.8, dated Jul. 13, 2023, 8 pages.

* cited by examiner

*Primary Examiner* — Douglas X Rodriguez
*Assistant Examiner* — Tracey M Mcmillion
(74) *Attorney, Agent, or Firm* — Crowell & Moring LLP

(57) ABSTRACT

There are provided a drive board and so on capable of achieving reduction in size. A drive board according to an embodiment of the present disclosure is a board configured to output a drive signal to be applied to a liquid jet head having a plurality of nozzles, including a plurality of drive devices configured to generate the drive signal for jetting liquid from the nozzles. The plurality of nozzles is separated into a plurality of nozzle groups, and the plurality of drive devices is each configured to generate the drive signal to be applied to corresponding one or more of the nozzle groups. The plurality of drive devices and the plurality of nozzle groups are electrically coupled to each other, and the plurality of drive devices are arranged side by side along a predetermined direction.

6 Claims, 9 Drawing Sheets

SECOND EMBODIMENT

FIRST EMBODIMENT

COMPARATIVE EXAMPLE

MODIFIED EXAMPLE 1

SECOND EMBODIMENT

MODIFIED EXAMPLE 2

MODIFIED EXAMPLE 3

MODIFIED EXAMPLE 4

DRIVE BOARD, LIQUID JET HEAD, AND LIQUID JET RECORDING DEVICE

RELATED APPLICATIONS

This application claims priority to Japanese Patent Application No. 2022-034771 filed on Mar. 7, 2022, the entire content of which is incorporated herein by reference.

BACKGROUND OF THE INVENTION

1. Field of the Invention

The present disclosure relates to a drive board, a liquid jet head, and a liquid jet recording device.

2. Description of the Related Art

Liquid jet recording devices equipped with liquid jet heads are used in a variety of fields, and a variety of types of liquid jet heads have been developed (see, e.g., JP2002-254629A).

In such a liquid jet head, in general, it is required to achieve reduction in size.

It is desirable to provide a drive board, a liquid jet head, and a liquid jet recording device capable of achieving the reduction in size.

SUMMARY OF THE INVENTION

A drive board according to an embodiment of the present disclosure is a board configured to output a drive signal to be applied to a liquid jet head having a plurality of nozzles, including a plurality of drive devices configured to generate the drive signal for jetting liquid from the nozzles. The plurality of nozzles is separated into a plurality of nozzle groups, and the plurality of drive devices is each configured to generate the drive signal to be applied to corresponding one or more of the nozzle groups. The plurality of drive devices and the plurality of nozzle groups are electrically coupled to each other, and the plurality of drive devices are arranged side by side along a predetermined direction.

A liquid jet head according to an embodiment of the present disclosure includes the drive board according to the embodiment of the present disclosure, and a jet section which is configured to jet the liquid based on the drive signal output from the drive board, and which has a plurality of nozzles.

A liquid jet recording device according to an embodiment of the present disclosure includes the liquid jet head according to the embodiment of the present disclosure.

According to the drive board, the liquid jet head, and the liquid jet recording device related to the embodiment of the present disclosure, it becomes possible to achieve reduction in size.

DETAILED DESCRIPTION OF THE PREFERRED EMBODIMENTS

An embodiment of the present disclosure will hereinafter be described in detail with reference to the drawings. It should be noted that the description will be presented in the following order:

1. First Embodiment (an example when the number of drive devices and the number of nozzle groups are the same as each other)
2. Modified Example of First Embodiment
   - Modified Example 1 (an example when wiring patterns corresponding to other nozzle groups than a nozzle group to be coupled thereto are also coupled)
3. Second Embodiment (an example when the number of drive devices and the number of nozzle groups are different from each other)
4. Modified Example of Second Embodiment
   - Modified Example 2 (an example in which two wiring patterns are separately coupled to both end side of a drive device)
   - Modified Example 3 (an example when wiring patterns corresponding to other nozzle groups than a nozzle group to be coupled thereto are also coupled)
   - Modified Example 4 (an example when five drive devices are arranged side by side within a drive board)
5. Other Modified Examples

1. First Embodiment

[Outline Configuration of Printer 5]

Figure 1:
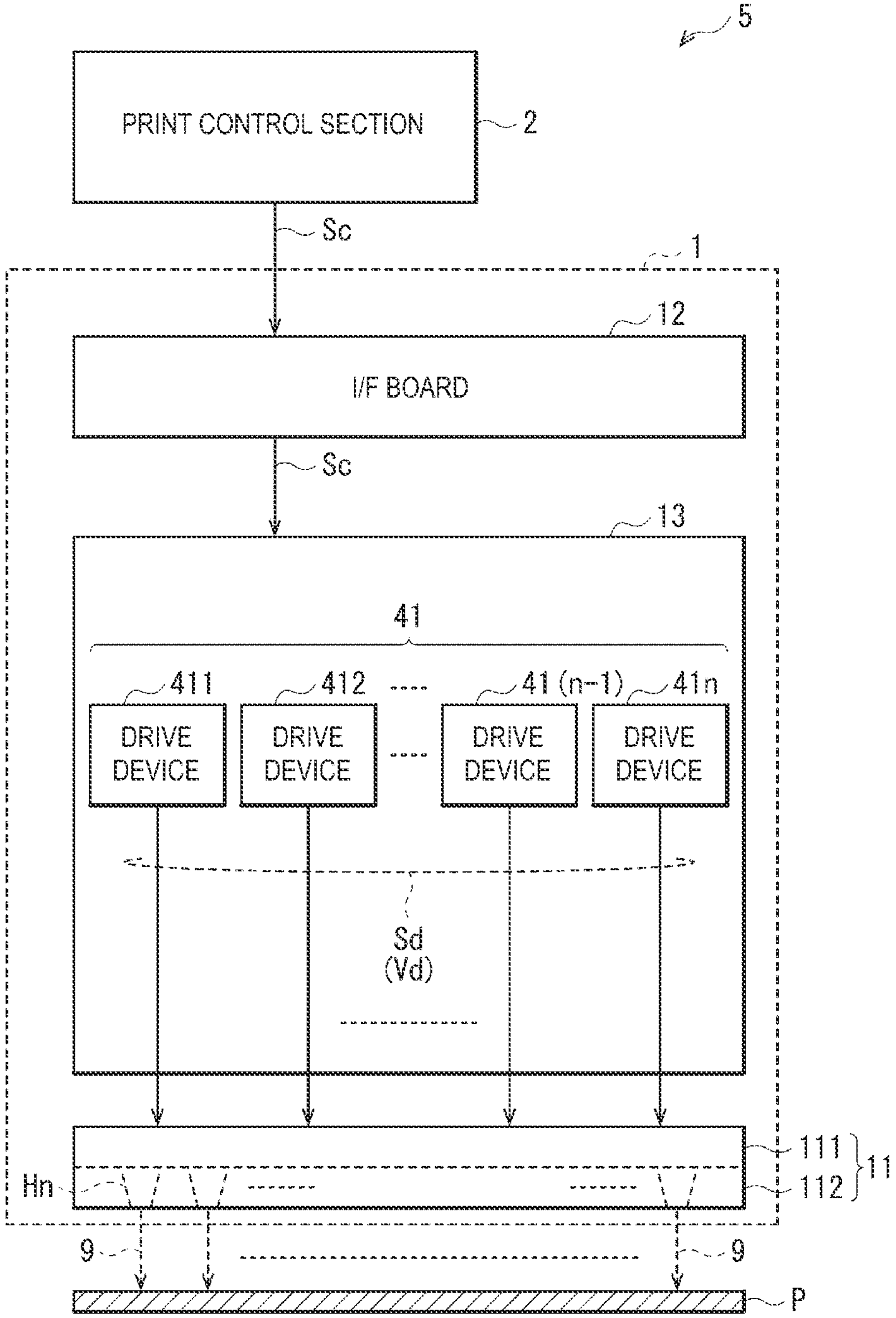
FIG. 1 is a block diagram showing an outline configuration example of a liquid jet recording device according to a first embodiment of the present disclosure.

FIG. 1 is a block diagram showing an outline configuration example of a printer 5 as a liquid jet recording device according to a first embodiment of the present disclosure. It should be noted that a scale size of each of the members is accordingly altered so that the member is shown in a recognizable size in the drawings used in the description of the present specification.

The printer 5 is an inkjet printer for performing recording (printing) of images, characters, and the like on a recording target medium (e.g., recording paper P shown in FIG. 1) using ink 9 described later. As shown in FIG. 1, the printer 5 is mainly provided with an inkjet head 1 and a print control section 2.

It should be noted that the inkjet head 1 corresponds to a specific example of a "liquid jet head" in the present disclosure, and the printer 5 corresponds to a specific example of a "liquid jet recording device" in the present disclosure. Further, the ink 9 corresponds to a specific example of a "liquid" in the present disclosure.

(A. Print Control Section 2)

The print control section 2 is for supplying the inkjet head 1 with a variety of types of information (data). Specifically, as shown in FIG. 1, the print control section 2 is arranged to supply each of constituents (drive devices 41 described later and so on) in the inkjet head 1 with a print control signal Sc.

It should be noted that the print control signal Sc is arranged to include, for example, image data, an ejection timing signal, and a power supply voltage for making the inkjet head 1 operate.

(B. Inkjet Head 1)

The inkjet head 1 is a head for jetting (ejecting) the ink 9 shaped like a droplet from a plurality of nozzle holes Hn described later to the recording paper P as represented by dotted arrows in FIG. 1 to thereby perform recording of images, characters, and so on. As shown in FIG. 1, the inkjet head 1 is provided with a single jet section 11, a single I/F (interface) board 12, and a single drive board 13.

(B-1. Jet Section 11)

As shown in FIG. 1, the jet section 11 is a part which has the plurality of nozzle holes Hn, and which jets the ink 9 from these nozzle holes Hn. Such jet of the ink 9 is arranged to be performed (see FIG. 1) based on drive signals Sd (drive voltages Vd) output from the drive devices 41 described later on the drive board 13.

As shown in FIG. 1, such a jet section 11 is configured including an actuator plate 111 and a nozzle plate 112. It should be noted that it is arranged that the ink 9 is supplied to the jet section 11 (the actuator plate 111) from, for example, an ink tank (not shown in FIG. 1) in the inkjet head 1 via an ink supply tube.

(Nozzle Plate 112)

The nozzle plate 112 is a plate formed of a film material such as polyimide, or a metal material, and has the plurality of nozzle holes Hn described above as shown in FIG. 1. These nozzle holes Hn are formed side by side at predetermined intervals, and each have, for example, a circular shape. It should be noted that such two or more nozzle holes Hn each correspond to a specific example of a "nozzle" in the present disclosure.

(Actuator Plate 111)

The actuator plate 111 is a plate formed of a piezoelectric material such as PZT (lead zirconate titanate). The actuator plate 111 is provided with a plurality of channels (pressure chambers). These channels are each a part for applying pressure to the ink 9, and are arranged side by side so as to be parallel to each other at predetermined intervals. Each of the channels is partitioned with drive walls (not shown) formed of a piezoelectric body, and forms a groove part having a recessed shape in a cross-sectional view.

As such channels, there exist ejection channels for ejecting the ink 9, and dummy channels (non-ejection channels) which do not eject the ink 9. In other words, it is arranged that the ejection channels are filled with the ink 9 on the one hand, but the dummy channels are not filled with the ink 9 on the other hand. It should be noted that it is arranged that filling of each of the ejection channels with the ink 9 is performed via, for example, a flow channel (a common flow channel) commonly communicated with such ejection channels. Further, it is arranged that each of the ejection channels is individually communicated with the nozzle hole Hn in the nozzle plate 112 on the one hand, but each of the dummy channels is not communicated with the nozzle hole Hn on the other hand. The ejection channels and the dummy channels are alternately arranged side by side along a predetermined direction.

Further, on the inner side surfaces opposed to each other in the drive wall described above, there are respectively disposed drive electrodes. As the drive electrodes, there exist common electrodes disposed on the inner side surfaces facing the ejection channels, and active electrodes (individual electrodes) disposed on the inner side surfaces facing the dummy channels. These drive circuits and drive devices 41 described later are electrically coupled to each other via the drive board 13. Thus, it is arranged that the drive voltages Vd (the drive signals Sd) described above are applied from the drive devices 41 to the drive electrodes via the drive board 13 (see FIG. 1).

(B-2. I/F Board 12)

As shown in FIG. 1, the I/F board 12 is a board (a relay board) intervening between the drive board 13 and an outside (the print control section 2) of the inkjet head 1. Thus, it is arranged that the print control signal Sc input from the print control section 2 is supplied to the drive board 13 (the drive devices 41, and so on) via the I/F board 12.

(B-3. Drive Board 13)

As shown in FIG. 1, the drive board 13 is a board for electrically coupling the I/F board 12 and the jet section 11 to each other. It is arranged that this drive board 13 makes the drive devices 41 output the drive signals Sd described above to thereby individually control the jet operation of the ink 9 in the nozzle plate 112 described above.

As shown in FIG. 1, such a drive board 13 is provided with the plurality of drive devices 41. Specifically, in the example shown in FIG. 1, n drive devices 41 consisting of drive devices 411, 412, . . . , 41(*n*−1), 41*n* (n: an integer no smaller than 2) are disposed on the drive board 13.

As shown in FIG. 1, these drive devices 41 are each a device for generating and then outputting the drive signals Sd (the drive voltages Vd) described above for jetting the ink 9 from the nozzle holes Hn in the jet section 11. Such drive devices 41 are each formed of, for example, an ASIC (Application Specific Integrated Circuit).

[Detailed Configuration of Inkjet Head 1]

Figure 2:
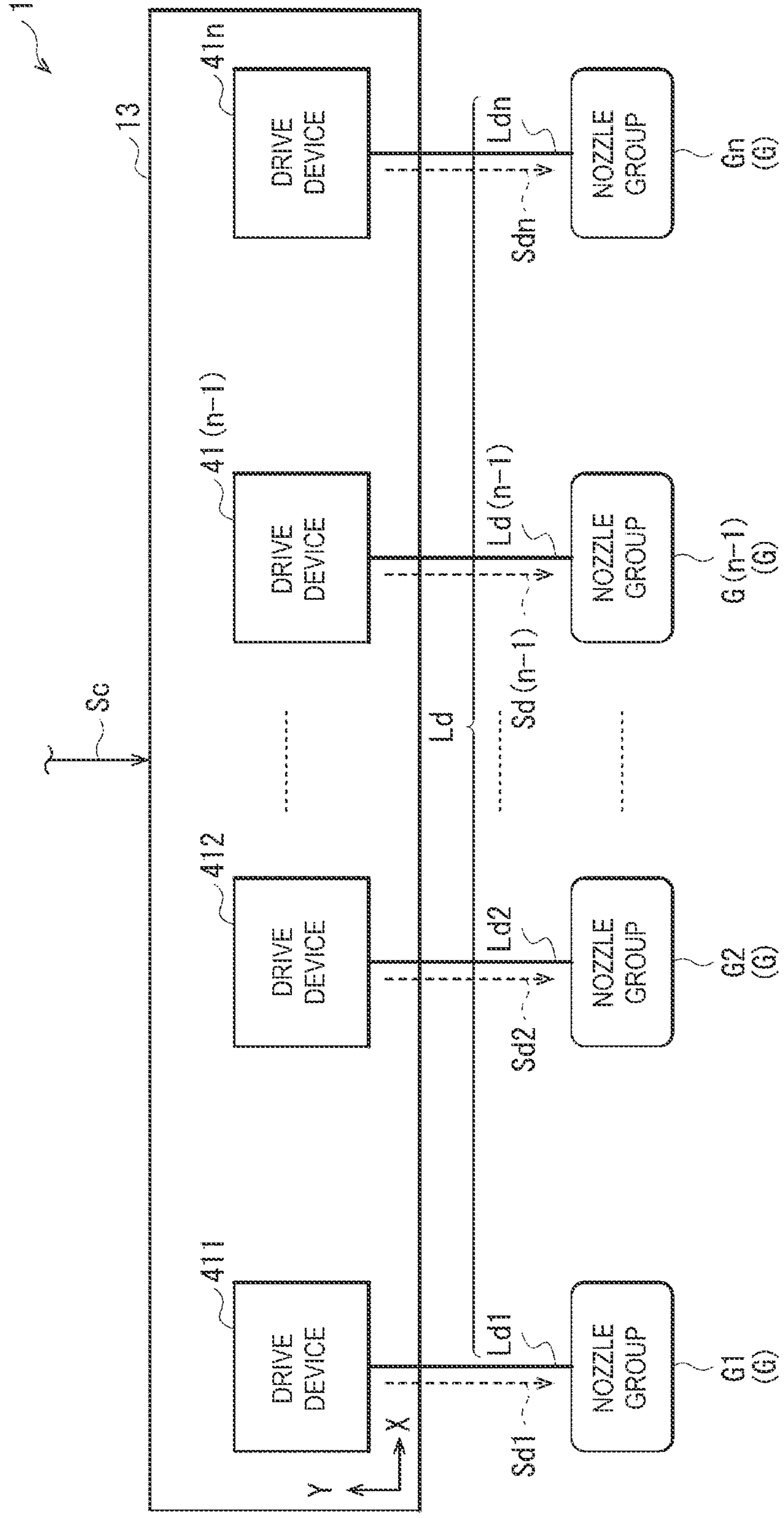
FIG. 2 is a block diagram schematically showing an outline configuration example of a liquid jet head shown in FIG. 1.

Then, a detailed configuration example of the inkjet head 1 will be described with reference to FIG. 2 and FIG. 3. FIG. 2 is a block diagram schematically showing the outline configuration example of the inkjet head 1 shown in FIG. 1, and FIG. 3 is a block diagram schematically showing the detailed configuration example of the inkjet head 1 shown in FIG. 2.

It should be noted that in FIG. 2, there are illustrated directions (an X-axis direction and a Y-axis direction) in a board surface (an X-Y plane) of the drive board 13. In each of FIG. 3 and other drawings (FIG. 5 to FIG. 9) described later, the illustration of the X-axis direction and the Y-axis direction described above is omitted for the sake of convenience.

Figure 3:
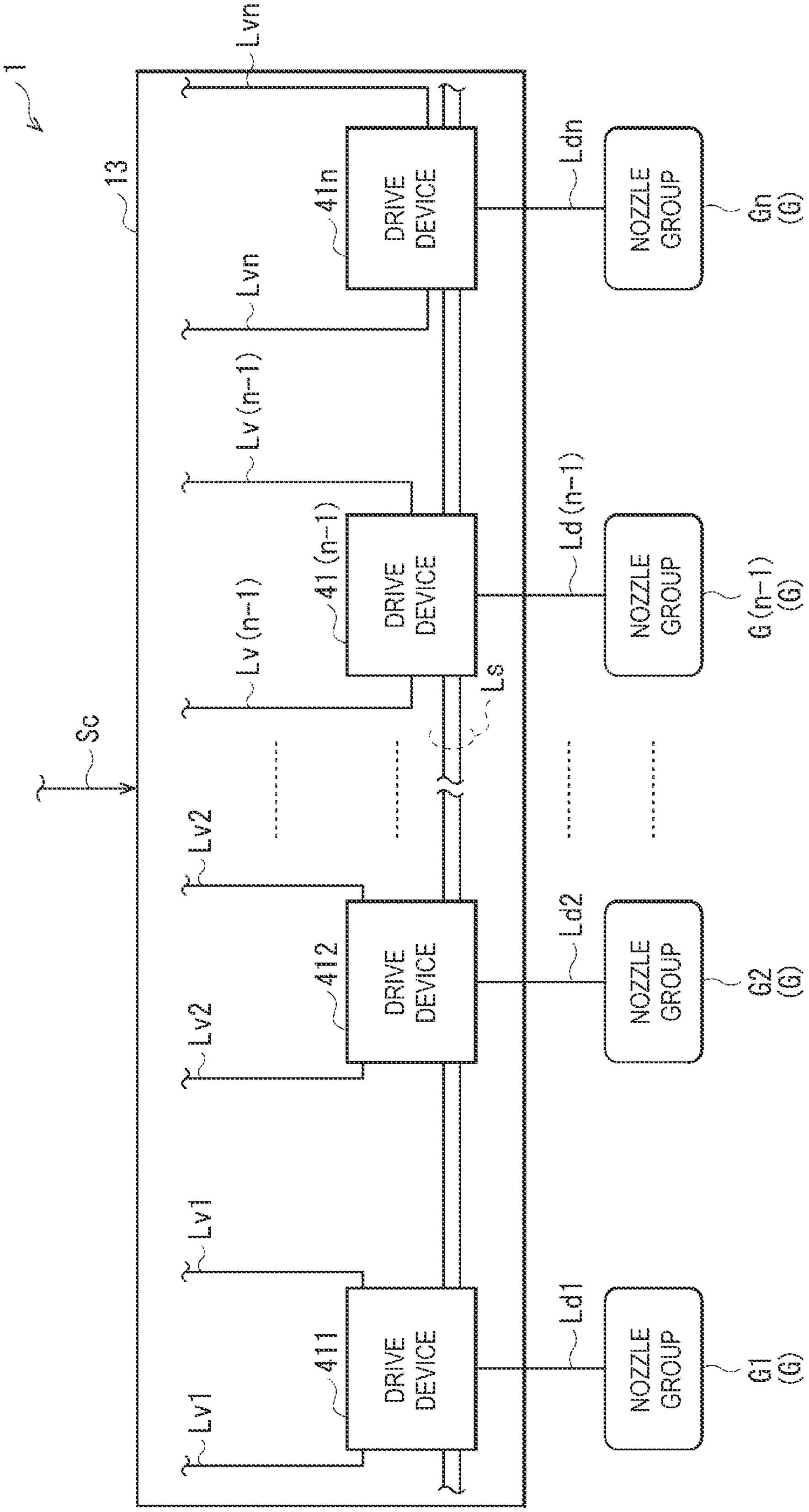
FIG. 3 is a block diagram schematically showing a detailed configuration example of the liquid jet head shown in FIG. 2.

First, as shown in FIG. 2 and FIG. 3, in the inkjet head 1, the plurality of nozzle holes Hn described above is separated (grouped) into a plurality of nozzle groups G. Specifically, in the example shown in FIG. 2 and FIG. 3, the plurality of nozzle holes Hn is separated into n nozzle groups G consisting of nozzle groups G1, G2, . . . , G(n−1), Gn. In other words, in this inkjet head 1, the number (n) of the drive devices 41 described above and the number (n) of the nozzle groups G are made the same as each other.

Further, the plurality of drive devices 41 and the plurality of nozzle groups G described above are electrically coupled to each other via drive lines Ld (Ld1 to Ldn). Specifically, as shown in FIG. 2 and FIG. 3, the drive device 411 and the nozzle group G1 are electrically coupled to each other via the drive line Ld1, and the drive device 412 and the nozzle group G2 are electrically coupled to each other via the drive line Ld2. Similarly, the drive device 41(*n*−1) and the nozzle group G(n−1) are electrically coupled to each other via the drive line Ld(n−1), and the drive device 41*n* and the nozzle group Gn are electrically coupled to each other via the drive line Ldn.

Further, the plurality of drive devices 41 are each arranged to generate the drive signal Sd to be applied to the corresponding nozzle group G, and then output the drive signal Sd toward the nozzle group G via the drive line Ld. Specifically, as shown in FIG. 2, the drive device 411 generates the drive signal Sd1 to be applied to the corresponding nozzle group G1, and then outputs the drive signal Sd1 toward the nozzle group G1 via the drive line Ld1. Similarly, the drive device 412 generates the drive signal Sd2 to be applied to the corresponding nozzle group G2, and then outputs the drive signal Sd2 toward the nozzle group G2 via the drive line Ld2. Similarly, the drive device 41(*n*−1) generates the drive signal Sd(n−1) to be applied to the corresponding nozzle group G(n−1), and then outputs the drive signal Sd(n−1) toward the nozzle group G(n−1) via the drive line Ld(n−1). The drive device 41*n* generates the drive signal Sdn to be applied to the corresponding nozzle group Gn, and then outputs the drive signal Sdn toward the nozzle group Gn via the drive line Ldn.

It should be noted that as an example of such a nozzle group G, there can be cited a nozzle array extending along a predetermined direction in the nozzle plate 112. It should be noted that this example is not a limitation, and it is possible to arrange that the nozzle groups are set using other grouping methods.

Further, on the board surface (the X-Y plane shown in FIG. 2) of the drive board 13, there is arranged the plurality of drive devices 41 side by side along a predetermined direction (the X-axis direction in this example). It should be noted that the expression "arranged side by side along a predetermined direction" is not limited to a linear arrangement (along the X-axis direction), but it is possible to adopt an arrangement with some displacement such as a staggered arrangement (a zigzag arrangement) along the Y-axis direction.

Further, on this drive board 13, a wiring pattern (a pattern of a variety of power supply lines) corresponding to a single nozzle group G to be coupled thereto is electrically coupled to each of the drive devices 41. This is because groups of the drive power supply to be used in accordance with the respective nozzle groups G are different from each other. Specifically, as shown in FIG. 3, to the drive device 411, there is electrically coupled a wiring pattern Lv1 corresponding to the nozzle group G1 to be coupled thereto, and to the drive device 412, there is electrically coupled a wiring pattern Lv2 corresponding to the nozzle group G2 to be coupled thereto. Similarly, to the drive device 41(*n*−1), there is electrically coupled a wiring pattern Lv(n−1) corresponding to the nozzle group G(n−1) to be coupled thereto, and to the drive device 41*n*, there is electrically coupled a wiring pattern Lvn corresponding to the nozzle group Gn to be coupled thereto. Further, in the example shown in FIG. 3, such wiring patterns are electrically coupled to both end parts (along the X-axis direction) in the respective drive devices 41.

Further, on this drive board 13, as shown in FIG. 3, the plurality of drive devices 41 is cascaded each other via a single signal line group Ls. It should be noted that such a signal line group Ls includes a variety of types of signal lines such as a clock signal or a data signal due to an LVDS (Low Voltage Differential Signaling) or the like.

[Operations and Functions/Advantages]

(A. Basic Operation of Printer 5)

In the printer 5, a recording operation (a printing operation) of images, characters, and so on to the recording target medium (the recording paper P and so on) is performed using such a jet operation of the ink 9 by the inkjet head 1 as described below. Specifically, in this inkjet head 1, the jet operation of the ink 9 using a shear mode is performed in the following manner.

First, the drive devices 41 on the drive board 13 apply the drive voltages Vd (the drive signals Sd) to the drive electrodes (the common electrodes and the active electrodes) described above in the actuator plate 111 in the jet section 11. Specifically, each of the drive devices 41 applies the drive voltage Vd to the drive electrodes disposed on the pair of drive walls partitioning the ejection channel described above. Thus, the pair of drive walls each deform so as to protrude toward the dummy channel adjacent to the ejection channel.

On this occasion, it results in that the drive wall makes a flexion deformation to have a V shape centering on the intermediate position in the depth direction in the drive wall. Further, due to such a flexion deformation of the drive wall, the ejection channel deforms as if the ejection channel bulges. As described above, due to the flexion deformation caused by a piezoelectric thickness-shear effect in the pair of drive walls, the volume of the ejection channel increases. Further, by the volume of the ejection channel increasing, the ink 9 is induced into the ejection channel as a result.

Subsequently, the ink 9 induced into the ejection channel in such a manner turns to a pressure wave to propagate to the inside of the ejection channel. Then, the drive voltage Vd to be applied to the drive electrodes becomes 0 (zero) V at the timing at which the pressure wave has reached the nozzle hole Hn of the nozzle plate 112 (or timing around that timing). Thus, the drive walls are restored from the state of the flexion deformation described above, and as a result, the volume of the ejection channel having once increased is restored again.

In such a manner, the pressure in the ejection channel increases in the process that the volume of the ejection channel is restored, and thus, the ink 9 in the ejection channel is pressurized. As a result, the ink 9 shaped like a droplet is ejected (see FIG. 1) toward the outside (toward the recording paper P) through the nozzle hole Hn. The jet operation (the ejection operation) of the ink 9 in the inkjet head 1 is performed in such a manner, and as a result, the recording operation of images, characters, and so on to the recording paper P is performed.

(B. Functions/Advantages in Inkjet Head 1)

Then, functions and advantages in the inkjet head 1 will be described in detail in comparison with a comparative example.

First, in an inkjet head having a plurality of nozzle groups, there is known a method of setting or controlling a drive power supply and drive signals for each of nozzle groups in order to suppress an ejection variation in each of the nozzle groups. It should be noted that since it is necessary to prepare a power supply pattern and a signal pattern for each of the nozzle groups, the drive devices and the wiring patterns on the drive board increase, which becomes a factor of increasing the board width.

On the other hand, in recent years, due to needs for high-definition, the nozzle pitch tends to be narrowed, and even when the number of nozzles is the same as that of a conventional product, the width of the nozzle group narrows. For the above reasons, it can be said that it is necessary to make the board width compact (to achieve reduction in size of the drive board) while the wiring patterns increase due to an increase in the number of nozzles (nozzle groups).

B-1. Comparative Example

Figure 4:
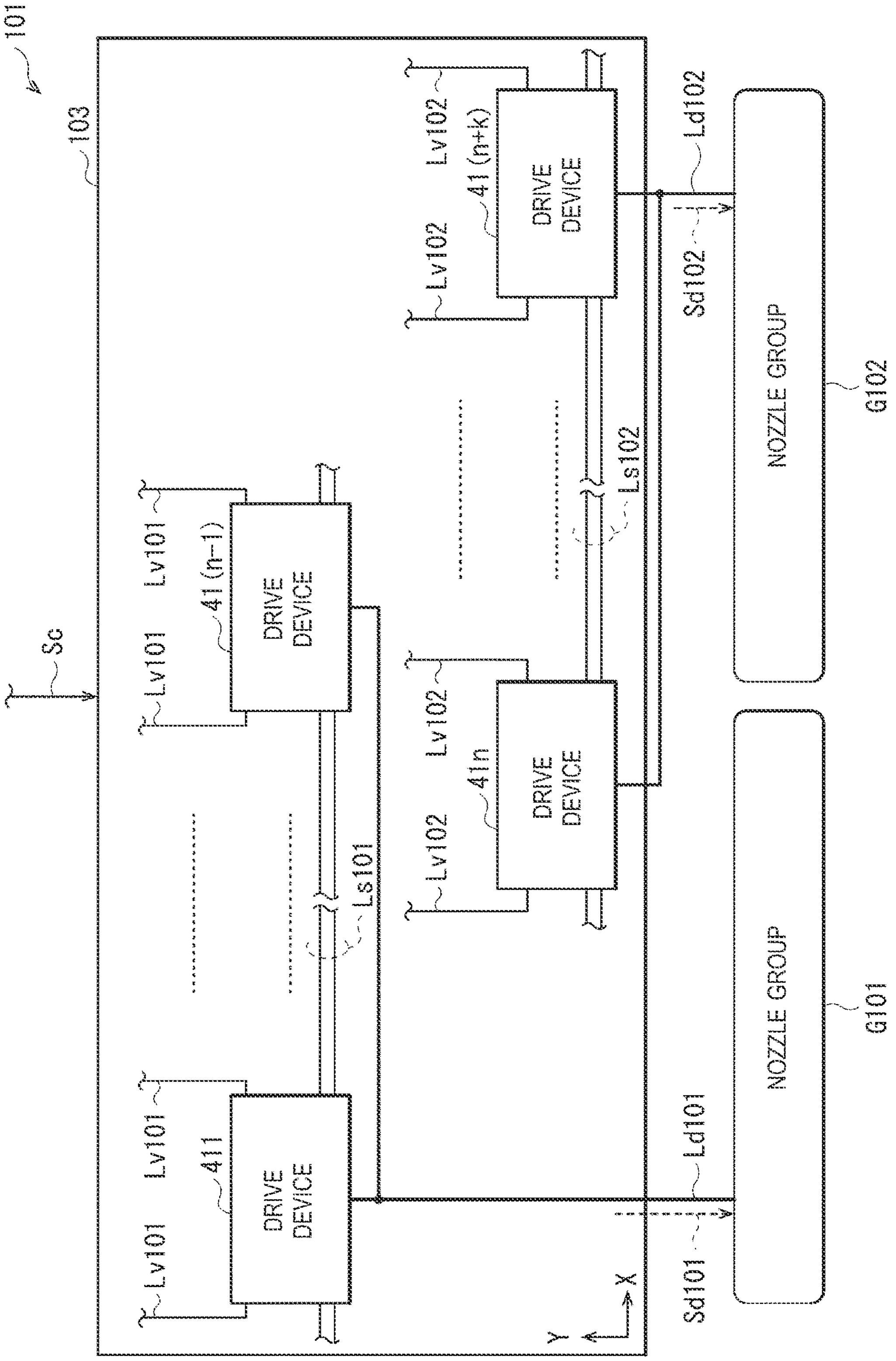
FIG. 4 is a block diagram schematically showing an outline configuration example of a liquid jet head according to a comparative example.

Here, FIG. 4 is a block diagram schematically showing an outline configuration example of a liquid jet head (an inkjet head 101) according to a comparative example. The inkjet head 101 in the comparative example corresponds to what is obtained by disposing a drive board 103 instead of the drive board 13, and two nozzle groups G101, G102 instead of the n nozzle groups G1 to Gn in the inkjet head 1 shown in FIG. 3. It should be noted that similarly to FIG. 2, in FIG. 4, there are illustrated the directions (the X-axis direction and the Y-axis direction) in a board surface (the X-Y plane) of the drive board 103.

As shown in FIG. 4, in the drive board 103 in this comparative example, first, the (n−1) drive devices 411 to 41(*n*−1) are arranged side by side along the predetermined direction (the X-axis direction), and are, at the same time, cascaded each other via a signal line group Ls101. In this drive board 103, further, the (k+1) drive devices 41*n* to 41(*n*+k) (k: an integer no smaller than 1) are arranged side by side along the predetermined direction (the X-axis direction), and are, at the same time, cascaded each other via a signal line group Ls102. Further, the device column consisting of the drive devices 411 to 41(*n*−1) and the device column consisting of the drive devices 41*n* to 41(*n*+k) are arranged side by side along the Y-axis direction in the drive board 103. In other words, while in the drive board 13 (see FIG. 3), the device column consisting of the drive devices 411 to 41*n* is arranged in a single line, the two device columns described above are arranged in this drive board 103.

Further, as shown in FIG. 4, in this drive board 103, the drive devices 411 to 41(*n*−1) are each electrically coupled to the nozzle group G101 via a common drive line Ld101. Further, it is arranged that the drive devices 411 to 41(*n*−1) each output the drive signal Sd101 corresponding to the nozzle group G101 toward the nozzle group G101 via the common drive line Ld101. On the other hand, the drive devices 41*n* to 41(*n*+k) are each electrically coupled to the nozzle group G102 via a common drive line Ld102. Further, it is arranged that the drive devices 41*n* to 41(*n*+k) each output the drive signal Sd102 corresponding to the nozzle group G102 toward the nozzle group G102 via the common drive line Ld102.

It should be noted that as shown in FIG. 4, to each of the drive devices 411 to 41(*n*−1), a wiring pattern Lv101 corresponding to the nozzle group G101 to be coupled thereto is electrically coupled. Similarly, to each of the drive devices 41*n* to 41(*n*+k), a wiring pattern Lv102 corresponding to the nozzle group G102 to be coupled thereto is electrically coupled.

As described above, in the inkjet head 101 in the comparative example, since the plurality of drive devices is arranged so as to be separated into a plurality of columns in the drive board 103, the following is achieved. In other words, there is a possibility that paths of the wiring lines (the wiring patters Lv101, Lv102, the drive lines Ld101, Ld102, and so on) on the drive board 103 are elongated or complicated. Further, regarding the signal line groups on the drive board 103, since the signal line groups are arranged so as to be separated into a plurality of signal line groups Ls101, Ls102, there is a possibility that the paths of the signal line groups are elongated or complicated. As a result, in the inkjet head 101 in the comparative example, it can be said that it is difficult to achieve the reduction in size of the drive board 103.

B-2. Functions/Advantages

In contrast, in the inkjet heads 1, since the following configuration is adopted, it is possible to obtain, for example, the following functions and advantages.

That is, first, in this inkjet head 1, the drive signals Sd to be applied to the nozzle groups G corresponding to the respective drive devices 41 are output to the plurality of nozzle groups G electrically coupled to the plurality of drive devices 41. Further, the plurality of drive devices 41 is arranged side by side along the predetermined direction (the X-axis direction).

Thus, the paths of the wiring patterns (the patterns of the variety of power supply lines and signal lines: Lv1 to Lvn) become shortened or simplified compared to when the plurality of drive devices 41 is arranged so as to be separated into a plurality of columns as in, for example, the comparative example described above. Further, regarding also the paths such as the drive lines Ld, the drive lines Ld become shortened or simplified compared to the comparative example described above. As a result, in the first embodiment, it becomes possible to achieve the reduction in size of the drive board 13 compared to the comparative example described above.

Further, since such wiring patterns Lv1 to Lvn becomes shortened or simplified, it is possible to reduce a wiring impedance, and it is possible to reduce the number of components such as a bypass capacitor for the power supply. As a result, it also becomes possible to reduce the overall cost of the drive board 13 and the inkjet head 1.

Further, in the first embodiment, since only the wiring pattern corresponding to the nozzle group G to be coupled thereto out of the plurality of nozzle groups G is electrically coupled to each of the plurality of drive devices 41, the following is achieved. That is, the number of the wiring patterns to electrically be coupled is reduced compared to when, for example, the wiring patterns (all of Lv1 to Lvn) corresponding respectively to the plurality of nozzle groups G are electrically coupled (corresponding to, for example, the case of Modified Example 1 described later). As a result, it becomes possible to achieve a further reduction in size of the drive board 13. Further, since the wiring patterns (Lv1 to Lvn) are electrically coupled so as to be separated from each other, it also becomes possible to prevent noise interference between these wiring patterns.

In particular in the first embodiment, since only the wiring pattern (any one of Lv1 to Lvn) corresponding to a single nozzle group G to be coupled thereto out of the plurality of nozzle groups G is electrically coupled to each of the plurality of drive devices 41, the following is achieved. That is, the number of the wiring patterns to electrically be coupled is further reduced compared to when, for example, the wiring patterns (two or more of Lv1 to Lvn) corresponding to the plurality of nozzle groups G to be coupled thereto are electrically coupled, respectively. As a result, it becomes possible to further reduce the size of the drive board 13.

In addition, in the first embodiment, since the plurality of drive devices 41 is cascaded each other via the single signal line group Ls, the following is achieved. Specifically, the paths of the wiring pattern of the signal line group Ls are also shortened or simplified compared to the case (the case of the parallel coupling using the plurality of signal line groups Ls as in, for example, the comparative example described above) other than the cascade coupling. As a result, it becomes possible to achieve a further reduction in size of the drive board 13.

2. Modified Example of First Embodiment

Then, a modified example (Modified Example 1) of the first embodiment described above will be described. It should be noted that hereinafter, the same constituents as those in the first embodiment are denoted by the same reference symbols, and the description thereof will arbitrarily be omitted.

Modified Example 1

(Configuration)

Figure 5:
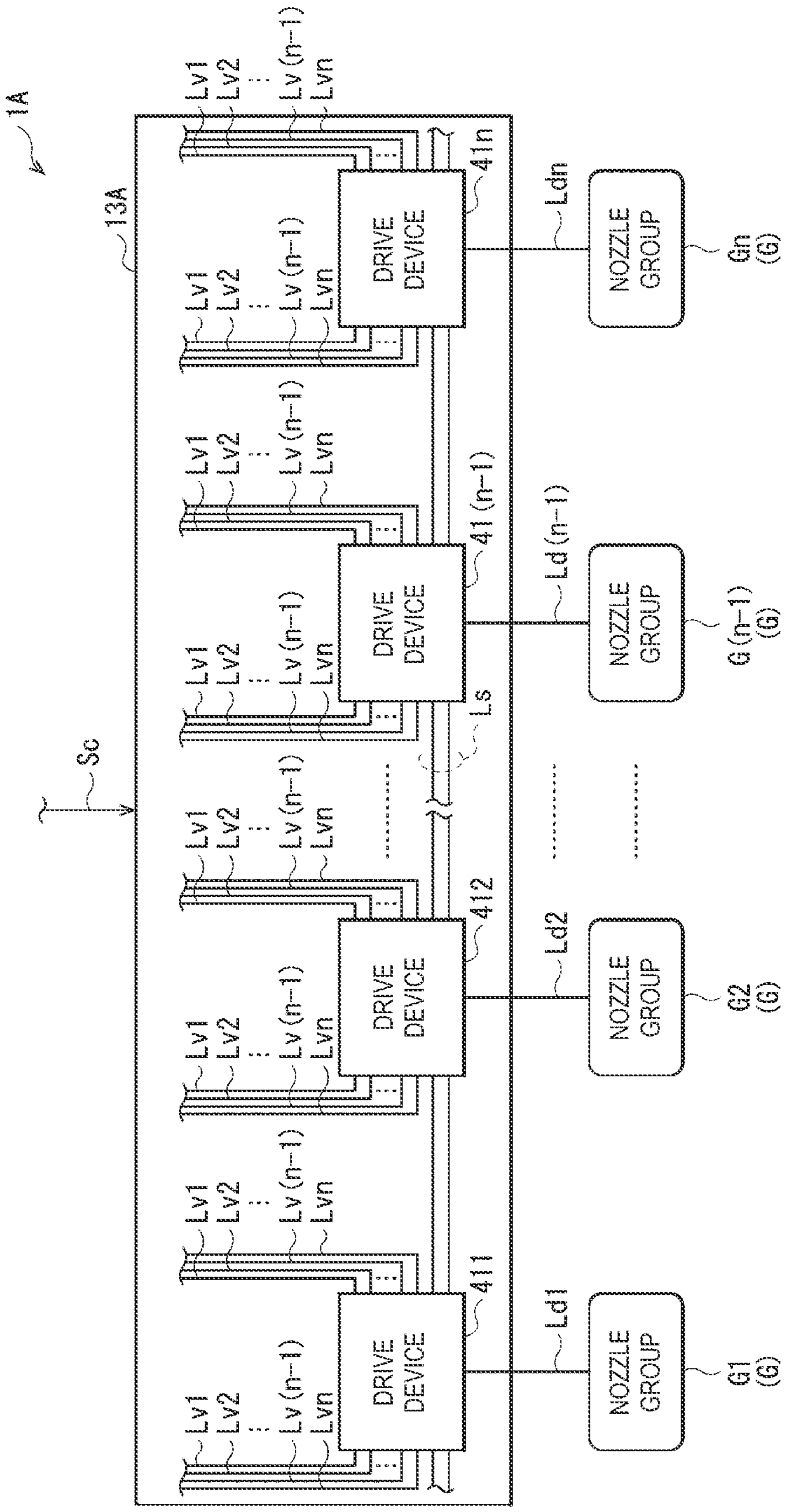
FIG. 5 is a block diagram schematically showing an outline configuration example of a liquid jet head according to Modified Example 1.

FIG. 5 is a block diagram schematically showing an outline configuration example of a liquid jet head (an inkjet head 1A) according to Modified Example 1. The inkjet head 1A according to Modified Example 1 corresponds to what is obtained by disposing a drive board 13A instead of the drive board 13 in the inkjet head 1 (see FIG. 3) according to the first embodiment, and the rest of the configuration is made substantially the same.

It should be noted that the inkjet head 1A corresponds to a specific example of the "liquid jet head" in the present disclosure.

This drive board 13A corresponds to what is obtained by changing a coupling configuration of the wiring pattern to the drive devices 41 in the drive board 13 (see FIG. 3), and the rest of the configuration is made basically the same.

Specifically, as shown in FIG. 5, the wiring patterns (all of Lv1 to Lvn) corresponding respectively to the plurality of nozzle groups G are electrically coupled to each of the drive devices 41. Specifically, each of the wiring patterns Lv1 to Lvn is electrically coupled to each of the drive devices 411, 412, . . . , 41*n*. As described above, in Modified Example 1, unlike the case of the first embodiment described above, it is arranged that the wiring patterns corresponding to other nozzle groups G than the nozzle group G to be coupled thereto are also electrically coupled to each of the drive devices 41.

(Functions/Advantages)

Also in Modified Example 1 having such a configuration, it becomes possible to obtain substantially the same advantages due to basically the same function as that of the first embodiment.

3. Second Embodiment

Then, a second embodiment of the present disclosure will be described. Unlike the first embodiment and Modified Example 1 described hereinabove, the second embodiment corresponds to an example when the number (three) of the drive devices 41 and the number (two) of the nozzle groups G are different from each other. It should be noted that hereinafter, the same constituents as those in the first embodiment are denoted by the same reference symbols, and the description thereof will arbitrarily be omitted.

(Configuration)

Figure 6:
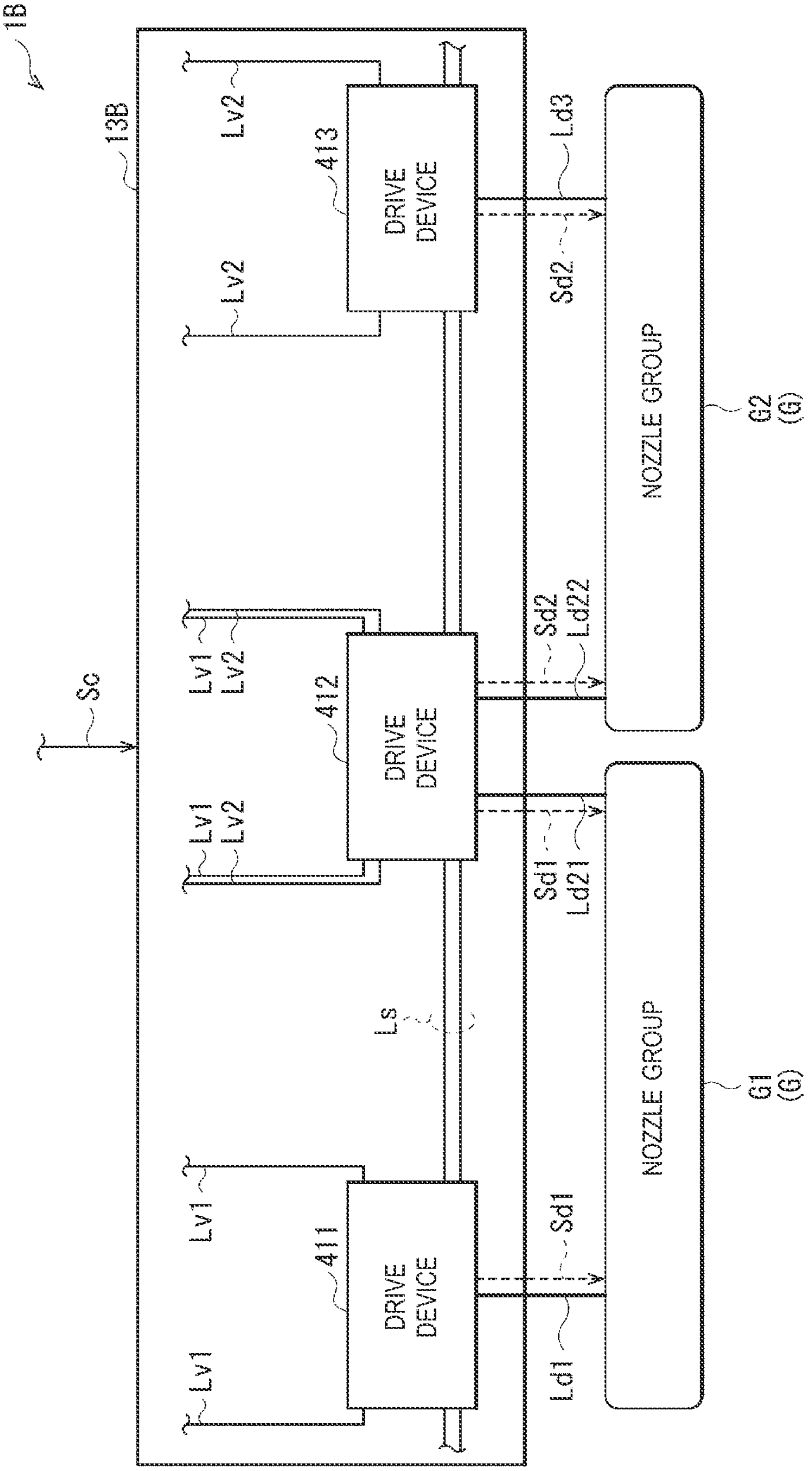
FIG. 6 is a block diagram schematically showing an outline configuration example of a liquid jet head according to a second embodiment.

FIG. 6 is a block diagram schematically showing an outline configuration example of a liquid jet head (an inkjet head 1B) according to the second embodiment. The inkjet head 1B according to the second embodiment corresponds to what is obtained by disposing a drive board 13B instead of the drive board 13 and changing the number of the nozzle groups G (changing the nozzle groups G to the two nozzle groups G1, G2) in the inkjet head 1 (see FIG. 3), and the rest of the configuration is made basically the same.

It should be noted that the inkjet head 1B corresponds to a specific example of the "liquid jet head" in the present disclosure.

The drive board 13B corresponds to what is obtained by changing the number of the drive devices 41 (changing the drive devices 41 to the three drive devices 411 to 413), and changing the coupling configuration of the wiring patterns and the drive lines Ld to the drive devices 41 in the drive board 13 (see FIG. 3), and the rest of the configuration is made substantially the same.

Specifically, as shown in FIG. 6, in this drive board 13B, the drive device 411 and the nozzle group G1 are electrically coupled to each other via the drive line Ld1, and the drive device 413 and the nozzle group G2 are electrically coupled to each other via the drive line Ld3. In contrast, the drive device 412 is electrically coupled to the nozzle group G1 via a drive line Ld21, and is at the same time electrically coupled to the nozzle group G2 via a drive line Ld22.

Therefore, the drive device 411 generates the drive signal Sd1 to be applied to the corresponding nozzle group G1, and then outputs the drive signal Sd1 toward the nozzle group G1 via the drive line Ld1, and at the same time, the drive device 413 generates the drive signal Sd2 to be applied to the corresponding nozzle group G2, and then outputs the drive signal Sd2 toward the nozzle group G2 via the drive line Ld3. In contrast, the drive device 412 is arranged to generate the drive signal Sd1 to be applied to the corresponding nozzle group G1, then outputs the drive signal Sd1 toward the nozzle group G1 via the drive line Ld21, and at the same time, generate the drive signal Sd2 to be applied to the corresponding nozzle group G2, and then outputs the drive signal Sd2 toward the nozzle group G2 via the drive line Ld22.

Further, as shown in FIG. 6, to each of the drive devices 411, 413, there is electrically coupled the wiring pattern (Lv1 or Lv2) corresponding to a single nozzle group G (G1 or G2) to be coupled thereto out of the plurality of nozzle groups G (G1, G2). Specifically, to the drive device 411, there is electrically coupled the wiring pattern Lv1 corresponding to the single nozzle group G1 to be coupled thereto, and at the same time, the wiring pattern Lv2 corresponding to the single nozzle group G2 to be coupled thereto is electrically coupled to the drive device 413. In contrast, to the drive device 412, there are electrically coupled the wiring patterns Lv1, Lv2 corresponding respectively to the plurality of nozzle groups G1, G2 to be coupled thereto out of the plurality of nozzle groups G1, G2.

It should be noted that the drive devices 411, 413 shown in FIG. 6 each correspond to a specific example of a "first drive device" in the present disclosure. Further, the drive device 412 shown in FIG. 6 corresponds to a specific example of a "second drive device" in the present disclosure. This point also applies to Modified Example 2 (see FIG. 7) and Modified Example 3 (see FIG. 8) described later.

(Functions/Advantages)

Also in the second embodiment having such a configuration, it becomes possible to obtain substantially the same advantages due to basically the same function as that of the first embodiment.

Further, in particular in the second embodiment, to each of the drive devices 411, 413, there is electrically coupled the wiring pattern (Lv1 or Lv2) corresponding to the single nozzle group G (G1 or G2) to be coupled thereto out of the plurality of nozzle groups G (G1, G2). In contrast, to the drive device 412, there are electrically coupled the wiring patterns Lv1, Lv2 corresponding respectively to the plurality of nozzle groups G1, G2 to be coupled thereto out of the plurality of nozzle groups G1, G2. Thus, it is possible to electrically couple the single wiring pattern or the plurality of wiring patterns corresponding thereto to the drive device 41 in accordance with, for example, the numbers, the arrangement relation, and so on of the drive devices 41 and the nozzle groups G, and thus, it is possible to increase the degree of freedom of the coupling configuration of the wiring patterns. As a result, it becomes possible to enhance the convenience while achieving the reduction in size of the drive board 13B.

4. Modified Example of Second Embodiment

Then, some modified examples (Modified Example 2 to Modified Example 4) of the second embodiment described above will be described. It should be noted that hereinafter, the same constituents as those in the first or second embodiment are denoted by the same reference symbols, and the description thereof will arbitrarily be omitted.

Modified Example 2

(Configuration)

Figure 7:
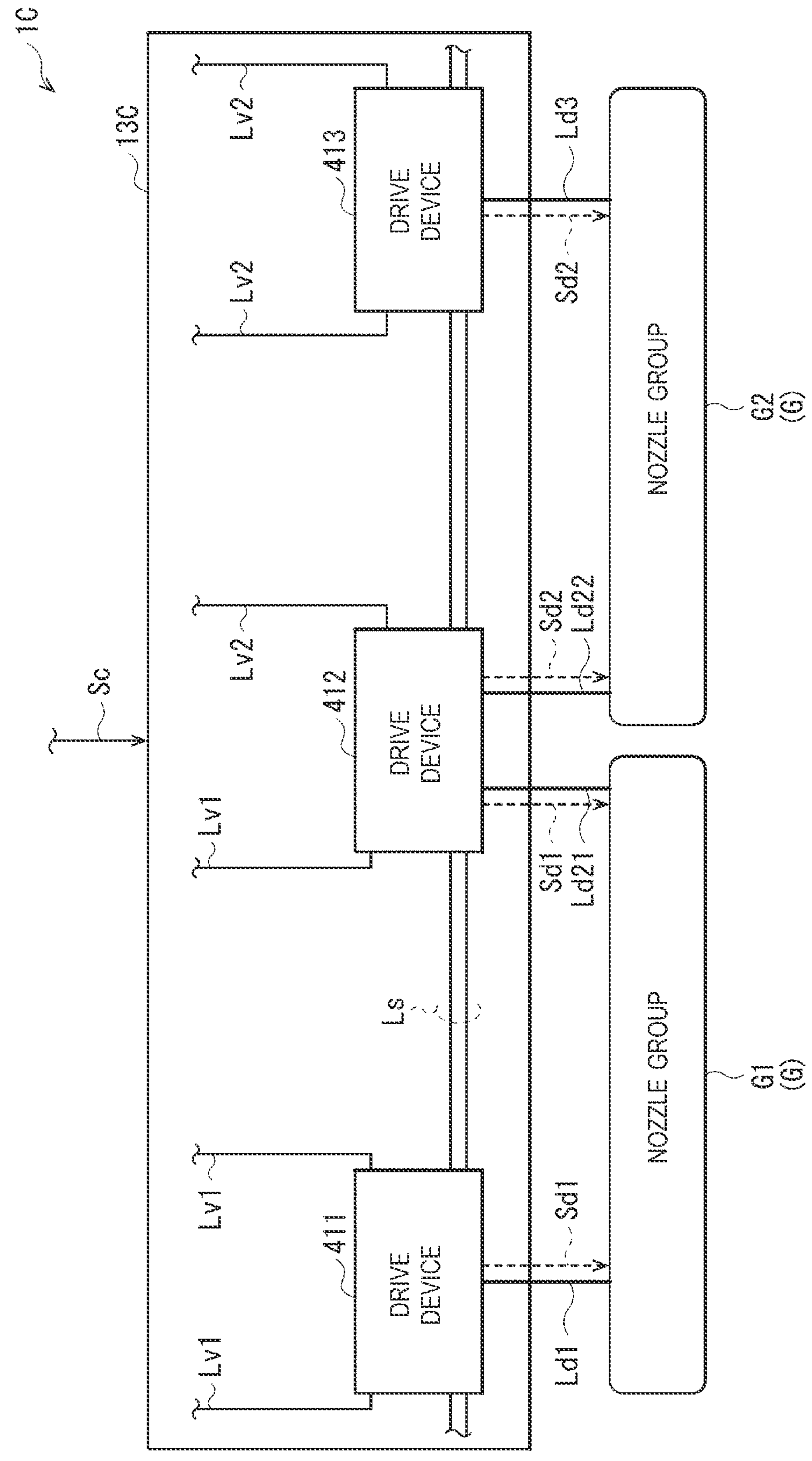
FIG. 7 is a block diagram schematically showing an outline configuration example of a liquid jet head according to Modified Example 2.

FIG. 7 is a block diagram schematically showing an outline configuration example of a liquid jet head (an inkjet head 1C) according to Modified Example 2. The inkjet head 1C according to Modified Example 2 corresponds to what is obtained by disposing a drive board 13C instead of the drive board 13B in the inkjet head 1B (see FIG. 6) according to the second embodiment, and the rest of the configuration is made substantially the same.

It should be noted that the inkjet head 1C corresponds to a specific example of the "liquid jet head" in the present disclosure.

This drive board 13C corresponds to what is obtained by partially changing a coupling configuration of the wiring pattern to the drive devices 41 in the drive board 13B (see FIG. 6), and the rest of the configuration is made basically the same.

Specifically, as shown in FIG. 7, first, to each of the drive devices 411, 413, there is electrically coupled the wiring pattern (Lv1 or Lv2) corresponding to the single nozzle group G (G1 or G2) to be coupled thereto out of the plurality of nozzle groups G (G1, G2) similarly to the second embodiment (see FIG. 6). Further, also to the drive device 412, there are electrically coupled the wiring patterns Lv1, Lv2 corresponding respectively to the plurality of nozzle groups G1, G2 to be coupled thereto out of the plurality of nozzle groups G1, G2 similarly to the second embodiment (see FIG. 6).

It should be noted that while both of the wiring patterns Lv1, Lv2 are electrically coupled to both end part sides (along the X-axis direction) in the drive device 412 in the second embodiment (see FIG. 6), the following is arranged in Modified Example 2. That is, as shown in FIG. 7, the wiring pattern Lv1 is electrically coupled to one end part side (along the X-axis direction) in the drive device 412, and at the same time, the wiring pattern Lv2 is electrically coupled to the other end part side in the drive device 412.

It should be noted that the wiring pattern Lv1 coupled to the drive device 412 shown in FIG. 7 corresponds to a specific example of a "first wiring pattern" in the present disclosure. Further, the wiring pattern Lv2 coupled to the drive device 412 shown in FIG. 7 corresponds to a specific example of a "second wiring pattern" in the present disclosure.

(Functions/Advantages)

Also in Modified Example 2 having such a configuration, it becomes possible to obtain substantially the same advantages due to basically the same function as that of the second embodiment.

Further, in particular in Modified Example 2, since the wiring patterns Lv1, Lv2 corresponding to the two nozzle groups G1, G2 to be coupled thereto are electrically coupled individually to one and the other end part side in the drive device 412, the following is achieved. That is, the number of the wiring patterns to electrically be coupled to the end parts of the drive device 412 is reduced compared to when both of these wiring patterns Lv1, Lv2 are electrically coupled to at least one end part side in the drive device 412 as in, for example, the second embodiment. As a result, it becomes possible to further reduce the size of the drive board 13C.

Modified Example 3

(Configuration)

Figure 8:
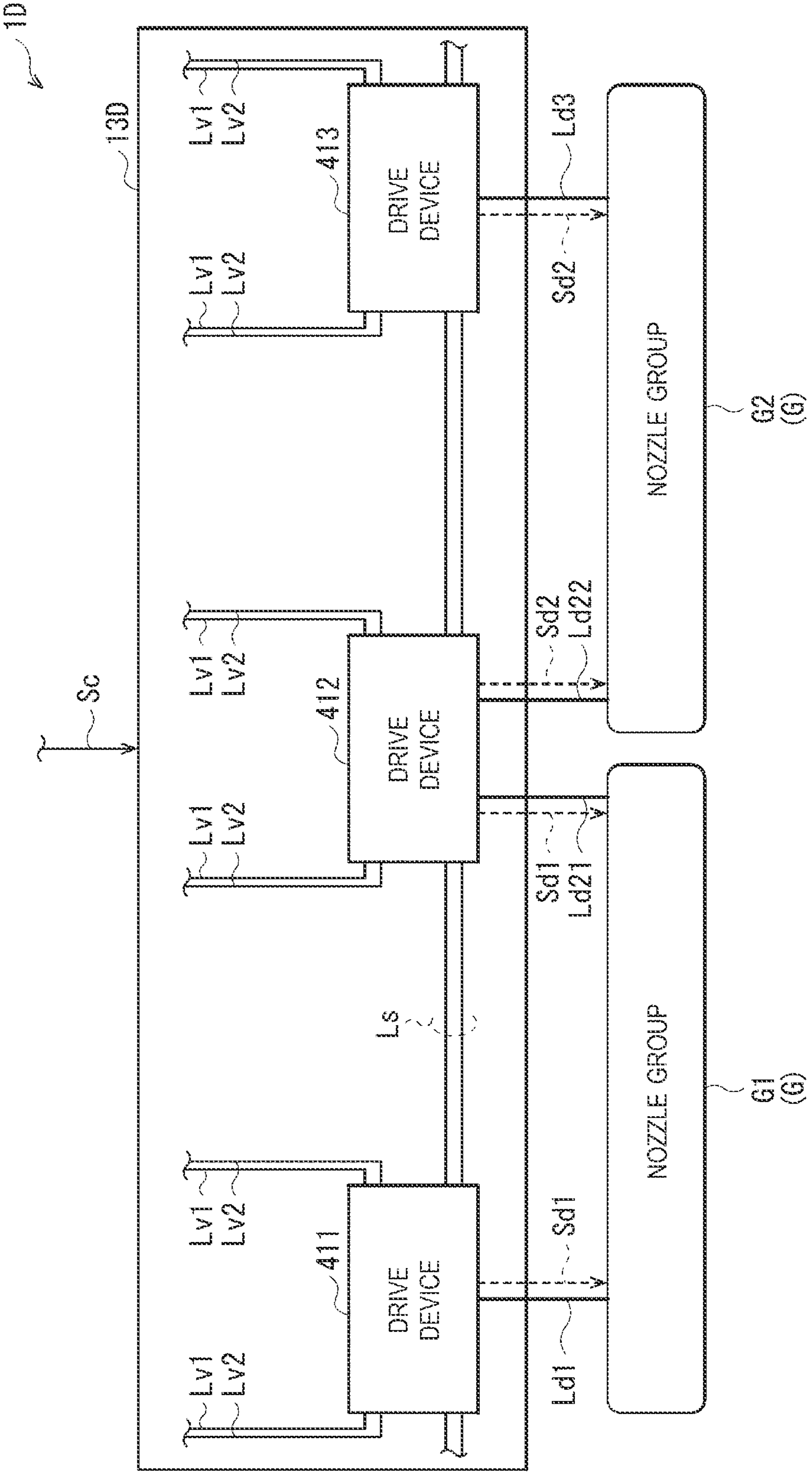
FIG. 8 is a block diagram schematically showing an outline configuration example of a liquid jet head according to Modified Example 3.

FIG. 8 is a block diagram schematically showing an outline configuration example of a liquid jet head (an inkjet head 1D) according to Modified Example 3. The inkjet head 1D according to Modified Example 3 corresponds to what is obtained by disposing a drive board 13D instead of the drive board 13B in the inkjet head 1B (see FIG. 6) according to the second embodiment, and the rest of the configuration is made substantially the same.

It should be noted that this inkjet head 1D corresponds to a specific example of the "liquid jet head" in the present disclosure.

This drive board 13D corresponds to what is obtained by changing a coupling configuration of the wiring pattern to the drive devices 41 in the drive board 13B (see FIG. 6), and the rest of the configuration is made basically the same.

Specifically, as shown in FIG. 8, the wiring patterns Lv1, Lvn corresponding respectively to the plurality of nozzle groups G1, G2 are electrically coupled to each of the drive devices 41. Specifically, each of the wiring patterns Lv1, Lv2 is electrically coupled to each of the drive devices 411, 412, and 413. As described above, in Modified Example 3, unlike the case of the second embodiment and Modified Example 2 described above, it is arranged that the wiring pattern corresponding to other nozzle groups G than the nozzle group G to be coupled thereto is also electrically coupled to each of the drive devices 41.

(Functions/Advantages)

Also in Modified Example 3 having such a configuration, it becomes possible to obtain substantially the same advantages due to basically the same function as that of the second embodiment.

Modified Example 4

(Configuration)

Figure 9:
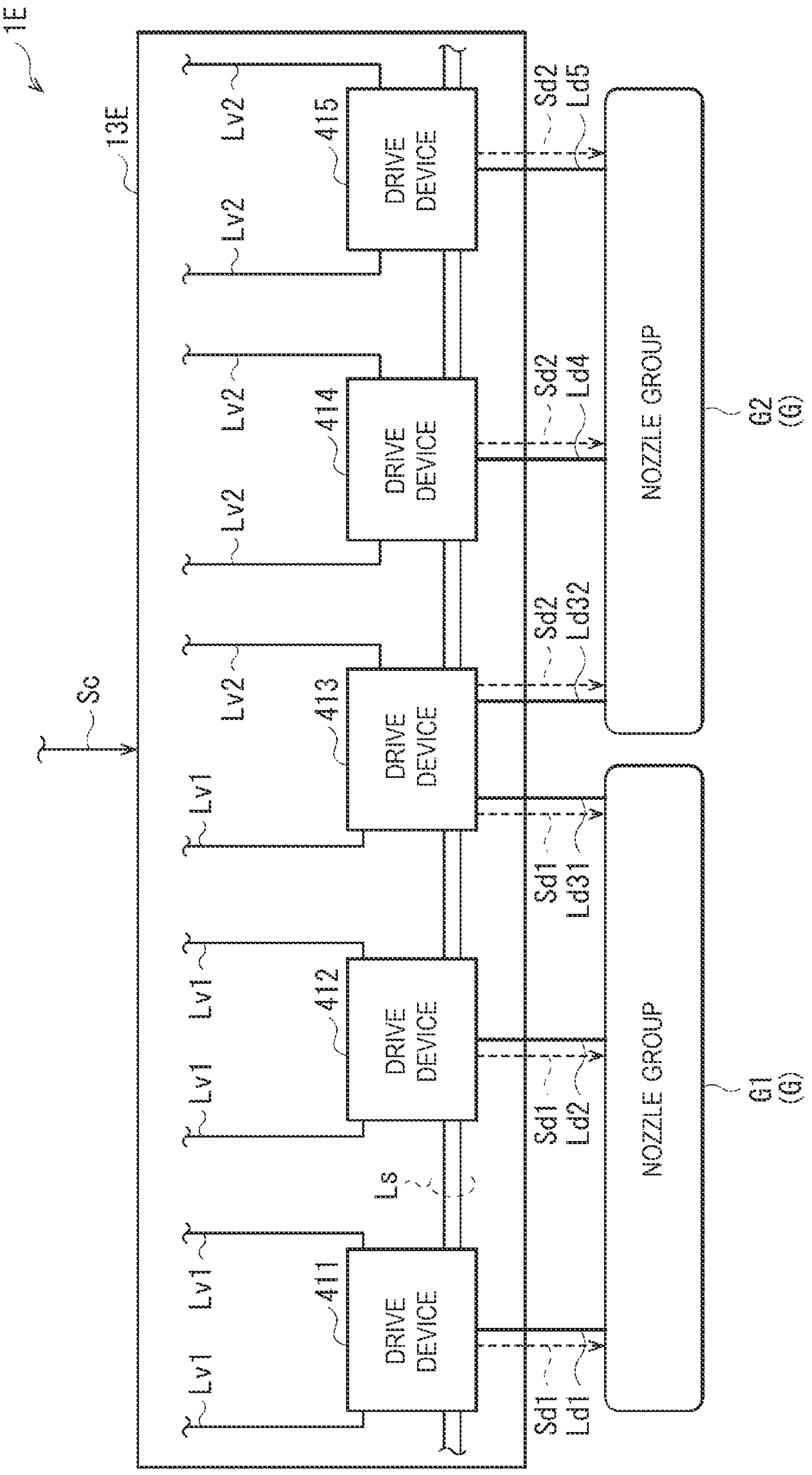
FIG. 9 is a block diagram schematically showing an outline configuration example of a liquid jet head according to Modified Example 4.

FIG. 9 is a block diagram schematically showing an outline configuration example of a liquid jet head (an inkjet head 1E) according to Modified Example 4. The inkjet head 1E according to Modified Example 4 corresponds to what is obtained by disposing a drive board 13E instead of the drive board 13B in the inkjet head 1B (see FIG. 6) according to the second embodiment, and the rest of the configuration is made substantially the same.

It should be noted that this inkjet head 1E corresponds to a specific example of the "liquid jet head" in the present disclosure.

This drive board 13E corresponds to what is obtained by changing the number of the drive devices 41 (changing the drive devices 41 to the five drive devices 411 to 415), and changing the coupling configuration of the wiring patterns and the drive lines Ld to the drive devices 41 in the drive board 13B (see FIG. 6), and the rest of the configuration is made substantially the same.

Specifically, as shown in FIG. 9, in this drive board 13E, the drive device 411 and the nozzle group G1 are electrically coupled to each other via the drive line Ld1, and the drive device 412 and the nozzle group G1 are electrically coupled to each other via the drive line Ld2. Similarly, the drive device 414 and the nozzle group G2 are electrically coupled to each other via the drive line Ld4, and the drive device 415 and the nozzle group G2 are electrically coupled to each other via the drive line Ld5. In contrast, the drive device 413 is electrically coupled to the nozzle group G1 via a drive line Ld31, and is at the same time electrically coupled to the nozzle group G2 via a drive line Ld32.

Therefore, the drive device 411 generates the drive signal Sd1 to be applied to the corresponding nozzle group G1, and then outputs the drive signal Sd1 toward the nozzle group G1 via the drive line Ld1, and at the same time, the drive device 412 generates the drive signal Sd1 to be applied to the corresponding nozzle group G1, and then outputs the drive signal Sd1 toward the nozzle group G1 via the drive line Ld2. Similarly, the drive device 414 generates the drive signal Sd2 to be applied to the corresponding nozzle group G2, and then outputs the drive signal Sd2 toward the nozzle group G2 via the drive line Ld4, and at the same time, the drive device 415 generates the drive signal Sd2 to be applied to the corresponding nozzle group G2, and then outputs the drive signal Sd2 toward the nozzle group G2 via the drive line Ld5. In contrast, the drive device 413 is arranged to generate the drive signal Sd1 to be applied to the corresponding nozzle group G1, then outputs the drive signal Sd1 toward the nozzle group G1 via the drive line Ld31, and at the same time, generate the drive signal Sd2 to be applied to the corresponding nozzle group G2, and then outputs the drive signal Sd2 toward the nozzle group G2 via the drive line Ld32.

Further, as shown in FIG. 9, to each of the drive devices 411, 412, 414, and 415, there is electrically coupled the wiring pattern (Lv1 or Lv2) corresponding to a single nozzle group G (G1 or G2) to be coupled thereto out of the plurality of nozzle groups G (G1, G2). Specifically, to each of the drive devices 411, 412, there is electrically coupled the wiring pattern Lv1 corresponding to the single nozzle group G1 to be coupled thereto, and at the same time, the wiring pattern Lv2 corresponding to the single nozzle group G2 to be coupled thereto is electrically coupled to each of the drive devices 414, 415. In contrast, to the drive device 413, there are electrically coupled the wiring patterns Lv1, Lv2 corresponding respectively to the plurality of nozzle groups G1, G2 to be coupled thereto out of the plurality of nozzle groups G1, G2. Further, similarly to the case of Modified Example 2 described above, the wiring pattern Lv1 is electrically coupled to one end part side (along the X-axis direction) in the drive device 413, and at the same time, the wiring pattern Lv2 is electrically coupled to the other end part side in the drive device 413.

It should be noted that the drive devices 411, 412, 414, 415 shown in FIG. 9 each correspond to a specific example of the "first drive device" in the present disclosure. Further, the drive device 413 shown in FIG. 9 corresponds to a specific example of the "second drive device" in the present disclosure. The wiring pattern Lv1 coupled to the drive device 413 shown in FIG. 9 corresponds to a specific example of the "first wiring pattern" in the present disclosure. Further, the wiring pattern Lv2 coupled to the drive device 413 shown in FIG. 9 corresponds to a specific example of the "second wiring pattern" in the present disclosure.

(Functions/Advantages)

Also in Modified Example 4 having such a configuration, it becomes possible to obtain substantially the same advantages due to basically the same function as that of the second embodiment.

It should be noted that in Modified Example 4, the drive signal Sd1 corresponding to the nozzle group G1 is output using the two drive devices 411, 412, the drive signal Sd2 corresponding to the nozzle group G2 is output using the two drive devices 414, 415, and the drive signals Sd1, Sd2 corresponding respectively to the nozzle groups G1, G2 are output using the drive device 413. It should be noted that a distribution configuration between the plurality of drive devices 41 and the plurality of nozzle groups G described above is not limited to this example, and other distribution configurations can be adopted. Specifically, it is possible to arrange that, for example, the drive signal Sd1 corresponding to the nozzle group G1 is output using the three drive devices 411, 412, and 413, and at the same time, the drive signal Sd2 corresponding to the nozzle group G2 is output using the two drive devices 414, 415.

5. Other Modified Examples

The present disclosure is described hereinabove citing the embodiments and some modified examples, but the present disclosure is not limited to the embodiments and so on, and a variety of modifications can be adopted.

For example, in the embodiments and so on described above, the description is presented specifically citing the configuration examples (the shape, the arrangement, the coupling configuration, the type, the number, and so on) of the members (the drive devices, the nozzle groups, the wiring patterns, the drive lines, the signal groups, and so on) in the printer and the inkjet head. It should be noted that regarding these configuration examples are not limited to the configuration examples described in the embodiments and so on described above, and it is possible to adopt other shapes, arrangement, coupling configurations, types, numbers, and so on.

Specifically, for example, the configuration of the I/F board and the drive board is not limited to what is described in the embodiments and so on described above, and it is possible to adopt other configurations. Further, in the embodiments and so on described above, the description is presented citing when the single drive board is disposed alone as an example, but two or more drive boards, for example, can be disposed. Further, in the embodiments and so on described above, there is described when the I/F board as a relay board is disposed inside the inkjet head, but this is not a limitation, and it is possible to eliminate such a relay board (the I/F board) from, for example, the inkjet head. In addition, in the embodiments and so on described above, the description is presented citing when the plurality of drive devices is cascaded each other via the (single) signal line group as an example, but this example is not a limitation. In other words, it is possible to arrange that, for example, the plurality of drive devices is not cascaded each other via the signal line group.

Further, a variety of types of structures can be adopted as the structure of the inkjet head. Specifically, for example, it is possible to adopt a so-called side-shoot type inkjet head which emits the ink 9 from a central portion in the extending direction of each of the ejection channels in the actuator plate 111. Alternatively, it is possible to adopt, for example, a so-called edge-shoot type inkjet head for ejecting the ink 9 along the extending direction of each of the ejection channels. Further, the type of the printer is not limited to the type described in the embodiment and so on described above, and it is possible to apply a variety of types such as an MEMS (Micro Electro-Mechanical Systems) type.

Further, for example, it is possible to apply the present disclosure to either of an inkjet head of a circulation type which uses the ink 9 while circulating the ink 9 between the ink tank and the inkjet head, and an inkjet head of a non-circulation type which uses the ink 9 without circulating the ink 9.

Further, the series of processing described in the above embodiment and so on can be arranged to be performed by hardware (a circuit), or can also be arranged to be performed by software (a program). When arranging that the series of processing is performed by the software, the software is constituted by a program group for making the computer perform the functions. The programs can be incorporated in advance in the computer described above to be used by the computer, for example, or can also be installed in the computer described above from a network or a recording medium to be used by the computer.

Further, in the above embodiment and so on, the description is presented citing the printer (the inkjet printer) as a specific example of the "liquid jet recording device" in the present disclosure, but this example is not a limitation, and it is also possible to apply the present disclosure to other devices than the inkjet printer. In other words, it is also possible to arrange that the "liquid jet head" (the inkjet head) of the present disclosure is applied to other devices than the inkjet printer. Specifically, it is also possible to arrange that the "liquid jet head" of the present disclosure is applied to a device such as a facsimile or an on-demand printer.

In addition, it is also possible to apply the variety of examples described hereinabove in arbitrary combination.

It should be noted that the advantages described in the present specification are illustrative only, but are not a limitation, and other advantages can also be provided.

Further, the present disclosure can also take the following configurations.

<1> A drive board configured to output a drive signal to be applied to a liquid jet head having a plurality of nozzles, comprising a plurality of drive devices configured to generate the drive signal for jetting liquid from the nozzles, wherein the plurality of nozzles is separated into a plurality of nozzle groups, the plurality of drive devices is each configured to generate the drive signal to be applied to corresponding one or more of the nozzle groups, the plurality of drive devices and the plurality of nozzle groups are electrically coupled to each other, and the plurality of drive devices is arranged side by side along a predetermined direction.

<2> The drive board according to <1>, wherein a wiring pattern corresponding to one or more nozzle groups to be coupled thereto out of the plurality of nozzle groups is electrically coupled to each of the drive devices.

<3> The drive board according to <2>, wherein the wiring pattern corresponding to a single nozzle group to be coupled thereto is electrically coupled to each of the drive devices.

<4> The drive board according to <2>, wherein the wiring pattern corresponding to a single nozzle group to be coupled thereto is electrically coupled to a first drive device included in the plurality of drive devices, and the wiring pattern corresponding to a plurality of the nozzle groups to be coupled thereto is electrically coupled to a second drive device included in the plurality of drive devices.

<5> The drive board according to <4>, wherein a first wiring pattern and a second wiring pattern which are the wiring patterns corresponding to two of the nozzle groups to be coupled thereto are electrically coupled to the second drive device, the first wiring pattern is electrically coupled to one end part side in the second drive device, and the second wiring pattern is electrically coupled to another end part side in the second drive device.

<6> The drive board according to any one of <1> to <5>, wherein the plurality of drive devices is cascaded each other via a single signal line group.

<7> A liquid jet head comprising: the drive board according to any one of <1> to <6>; and a jet section which is configured to jet the liquid based on the drive signal output from the drive board, and which has the plurality of nozzles.

<8> A liquid jet recording device comprising the liquid jet head according to <7>.

What is claimed is:

1. A drive board configured to output a drive signal to be applied to a liquid jet head having a plurality of nozzles, comprising a plurality of drive devices configured to generate the drive signal for jetting liquid from the nozzles, wherein the plurality of nozzles is separated into a plurality of nozzle groups, the plurality of drive devices is each configured to generate the drive signal to be applied to corresponding one or more of the nozzle groups, the plurality of drive devices and the plurality of nozzle groups are electrically coupled to each other, and the plurality of drive devices is arranged side by side along a predetermined direction, wherein a wiring pattern corresponding to one or more nozzle groups to be coupled thereto out of the plurality of nozzle groups is electrically coupled to each of the drive devices, and the wiring pattern corresponding to a single nozzle group to be coupled thereto is electrically coupled to a first drive device included in the plurality of drive devices, and the wiring pattern corresponding to the plurality of nozzle groups to be coupled thereto is electrically coupled to a second drive device included in the plurality of drive devices.

2. A liquid jet head comprising:

the drive board according to claim 1; and a jet section which is configured to jet the liquid based on the drive signal output from the drive board, and which has the plurality of nozzles.

3. A liquid jet recording device comprising the liquid jet head according to claim 2.

4. The drive board according to claim 1, wherein the plurality of drive devices is cascaded each other via a single signal line group.

5. The drive board according to claim 1, wherein a first wiring pattern and a second wiring pattern which are the wiring patterns corresponding to two of the nozzle groups to be coupled thereto are electrically coupled to the second drive device, the first wiring pattern is electrically coupled to one end part side in the second drive device, and the second wiring pattern is electrically coupled to another end part side in the second drive device.

6. The drive board according to claim 5, wherein the plurality of drive devices is cascaded each other via a single signal line group.

* * * * *